Nov. 3, 1964  O. MODERSOHN ETAL  3,155,884
DISTRIBUTION NETWORK WHICH EFFECTS
A SUBSTANTIALLY CONSTANT LOAD
Filed March 8, 1961  6 Sheets-Sheet 1

Inventors
Otto Modersohn
Hubertus Bettin

By  Michael J. Striker
Attorney

Inventors
Otto Modersohn
Hubertus Bettin

By
Attorney

Inventors
Otto Modersohn
Hubertus Bettin

By Richard J. Stiles,
Attorney

United States Patent Office 3,155,884
Patented Nov. 3, 1964

3,155,884
DISTRIBUTION NETWORK WHICH EFFECTS A SUBSTANTIALLY CONSTANT LOAD
Otto Modersohn, Volkmarode uber Braunschweig, and Hubertus Bettin, Braunschweig, Germany, assignors to Olympia Werke A.G., Wilhelmshaven, Germany
Filed Mar. 8, 1961, Ser. No. 94,180
Claims priority, application Germany, Mar. 8, 1960, O 7,276
14 Claims. (Cl. 317—137)

The present invention refers to machines for sorting punched cards and adapted to sense, preferably with the aid of electrical sensing means respectively associated with hole columns of the cards, the punched holes of punched cards moving through the machine and to distribute each of the cards into a respective sorting channel or compartment selected out of a plurality thereof according to the sensed holes of a particular card. The distribution of the cards is conventionally carried out by the actuation of a variable number of deflector devices, the number of deflector devices to be actuated simultaneously for a particular card depending upon the location of the sensed hole within the particular card. Conventionally, the above mentioned deflector devices are actuated by electromagnet units respectively associated with the individual deflector devices.

The number of deflector devices to be actuated for each individual card, and consequently the number of corresponding electromagnet units to be energized for the same purpose, varies greatly. If the cards are to be distributed into a selected one of a predetermined number of channels or compartments, the number of deflector devices and electromagnet units must be equal to the number of channels or compartments. If a particular card is to be guided into the first channel or compartment only one of the deflector devices is to be actuated, while if the particular card is to be guided into any one of the other channels or compartments, a plurality of deflector devices must be actuated, the number thereof corresponding to the sequential order number of the existing plurality of channels or compartments. Consequently, the number of electromagnet units to be energized simultaneously for guiding a particular card into the proper channel or compartment will vary between one electromagnet unit and the total number of available electromagnet units. Therefore, in conventional arrangements, the load on the power supply for energizing the electromagnet units varies correspondingly within a wide range which is bound to entail considerable variations of potential in the network connected with the electromagnet units.

On the other hand, since a speedy operation of the machine is desirable which is difficult to achieve with electro-mechanical control means, e.g., relays, and since it is highly desirable to limit the space requirements for the various control devices to a minimum, a control arrangement is desirable which replaces as far as possible electro-mechanical controls by electronic control means. In this case, however, variations of operating potentials within the network of the arrangement are not only undesirable, but must be avoided by all means as far as possible.

Providing, for this purpose, voltage stabilizer devices in the network of the machine would not be a satisfactory solution to the problem because such devices would require additional space and would hardly operate at a satisfactory speed if they are to deal with the above-mentioned great variations of potential.

It is therefore a main object of this invention to provide in a punched-card sorting machine of the type set forth a control arrangement which satisfactorily avoids potential variations due to greatly varying power requirements and still permits a comparatively high speed operation of the machine.

It is a further object of this invention to provide for such a control arrangement which requires comparatively little space within the entire arrangement.

It is still another object of this invention to provide for an electrical control arrangement as mentioned above which is entirely reliable and promises a long service life.

With above objects in view, a preferred embodiment of the invention provides, in a punched-card sorting machine a plurality of sorting means, the number thereof which is to be operated simultaneously during each of consecutive sorting steps being variable; a plurality of electrical actuating means, each associated with a different one of said sorting means for actuating the same, each of said actuating means requiring a predetermined amount of electrical energy during actuation; a plurality of electrical compensating means each corresponding to a different one of said electrical actuating means and adapted to consume the same amount of electrical energy as the corresponding electrical actuating means; an electrical circuit including all of said electrical actuating means and all of said electrical compensating means; and a plurality of control devices included in said electrical circuit and adapted to assume either one of two alternative control conditions, each of said control devices being associated with a different one of said electrical actuating means and with the respectively corresponding compensating means, and being constructed in such a manner as to include, in one of said alternative conditions, said associated compensating means in said circuit while disconnecting the corresponding electrical actuating means, and to include, in the other one of said alternative conditions, said electrical actuating means in said circuit, while disconnecting the corresponding compensating means, whereby the total energy consumed by the total number of said means included in the electrical circuit remains substantially constant irrespective of the number of electrical actuating means included in the circuit simultaneously.

In order to deal with certain conditions, particularly those prevailing in the case of the use of two-deck cards, to provide for a time differential between the electric pulses derived from the sensing of holes of the cards and the energizing impulses for the electromagnets actuating the deflector devices. In a modified embodiment of the invention this requirement is advantageously dealt with by arranging, in parallel with the above-mentioned series or chain of resistance-electromagnet combinations, a similarly composed chain of control resistances, the individual potentials appearing at the various junction points between the control resistances of this chain being shiftable a predetermined amount. Cross-connections between the just mentioned points and respectively corresponding junction points between the resistance-electromagnet combinations cause the potentials at such cross-connected junction points to be normally equal to each other. However, when the potentials at the junction points in the chain of control resistors is shifted, a potential difference appears between the just mentioned associated junction points, and this potential difference is utilized for energizing the pertaining electromagnet, only after, before this shift of potential, a pertaining actuator device, which is responsive to sensing pulses applied thereto, has prepared a path of current through the respective cross-connection.

In a further advantageous modification of the invention, the operation of the control elements of the arrangement is rendered independent from the duration of the individual sensing impulses by using, as control or switch means, bistable multi-vibrator circuits (flip-flop circuits).

In order to avoid malfunctions of the arrangement due to voltage variations in view of the use of mutually coupled control circuits, it is advisable to provide between the electrical sensing means and the means preparing the circuit for the energization of the electromagnet units, a galvanic separation, e.g., in the form of a transformer.

It is further possible to arrange on the input side of each individual transformer suitable blocking means for preventing interference pulses, e.g., a filter circuit composed of a capacitor and an inductance element constituted by the primary winding of the transformer.

Disturbance of the control operation in the machine due to possibly irregular movement of the punched cards can be avoided by providing in the circuit of the sensing means a control element which is influenced by one edge of the individual card when the latter reaches its operative position. The just mentioned control element is preferably part of an electronic control circuit.

A particularly useful embodiment of the invention is so constructed that, between the individual resistance-electromagnet combinations and the pertaining circuit preparing means (which are coupled with the sensing means through the above mentioned transformer), a control element is provided which may be a transistor or a relay circuit, which switches, by changing its condition, the pertaining control circuit whenever the potential at the junction points of the above mentioned control resistor chain is shifted.

The arrangement just mentioned may also be modified in such a manner that the resistor acting as control element is conected in anti-parallel relation with respect to its emitter-base circuit with a diode. The effect of this arrangement is that the transistor which otherwise would be exposed to a harmfully high voltage when the potential at the junction points of the control resistor chain is shifted, is protected against such overload.

Since the energizaton of one particular electromagnet associated with a corresponding position of the sensed hole in one of the cards requires that also all the consecutively following electromagnets associated with holes ahead of the sensed hole are energized, additional switching operations in the circuits rather immediately controlled by the sensing means are avoided by providing, according to the invention, means for deriving from the control elements causing energization of any one of the electromagnets also directly the energization of all the following electromagnets of the series thereof.

A separate cancelling or clearing operation for returning a circuit preparing control circuit actuated by the sensing of a hole, to its normal condition is avoided according to the invention by providing a connection between the individual circuit preparing control circuits and zero potential through a discharge condenser.

As mentioned above control elements are provided so as to be actuated when one edge of the moving card passes a predetermined point of its path. Conveniently a photo-electric arrangement is used for this purpose. However since a photo-diode or the like is able to carry only limited amounts of current which would result in comparatively weak control currents, the invention provides for a feed-back amplification for the multi-vibrator circuit controlled by the photo-electric arrangement.

Since the rise of current flow in electromagnets at the start of energization is comparatively slow it is well possible that current fluctuations occur when in the chain of resistance-electromagnet combinations one or more of the electromagnets are energized by actuation of the corresponding change-over switch means. In order to counteract such current fluctuation it is advisable to connect in parallel with each electromagnet a circuit in which the rise and fall of current is opposite to the conditions characteristic of the electromagnet. For instance a series-combination of a resistance and a capacitor may be used advantageously in this manner.

The novel features which are considered as characteristic for the invention are set forth in particular in the appended claims. The invention itself, however, both as to its construction and its method of operation, together, with additional objects and advantages thereof, will be best understood from the following description of specific embodiments when read in connection with the accompanying drawings, in which:

FIG. 11 is a circuit diagram illustrating the rectifier 19 of FIG. 4.

Figure 1:
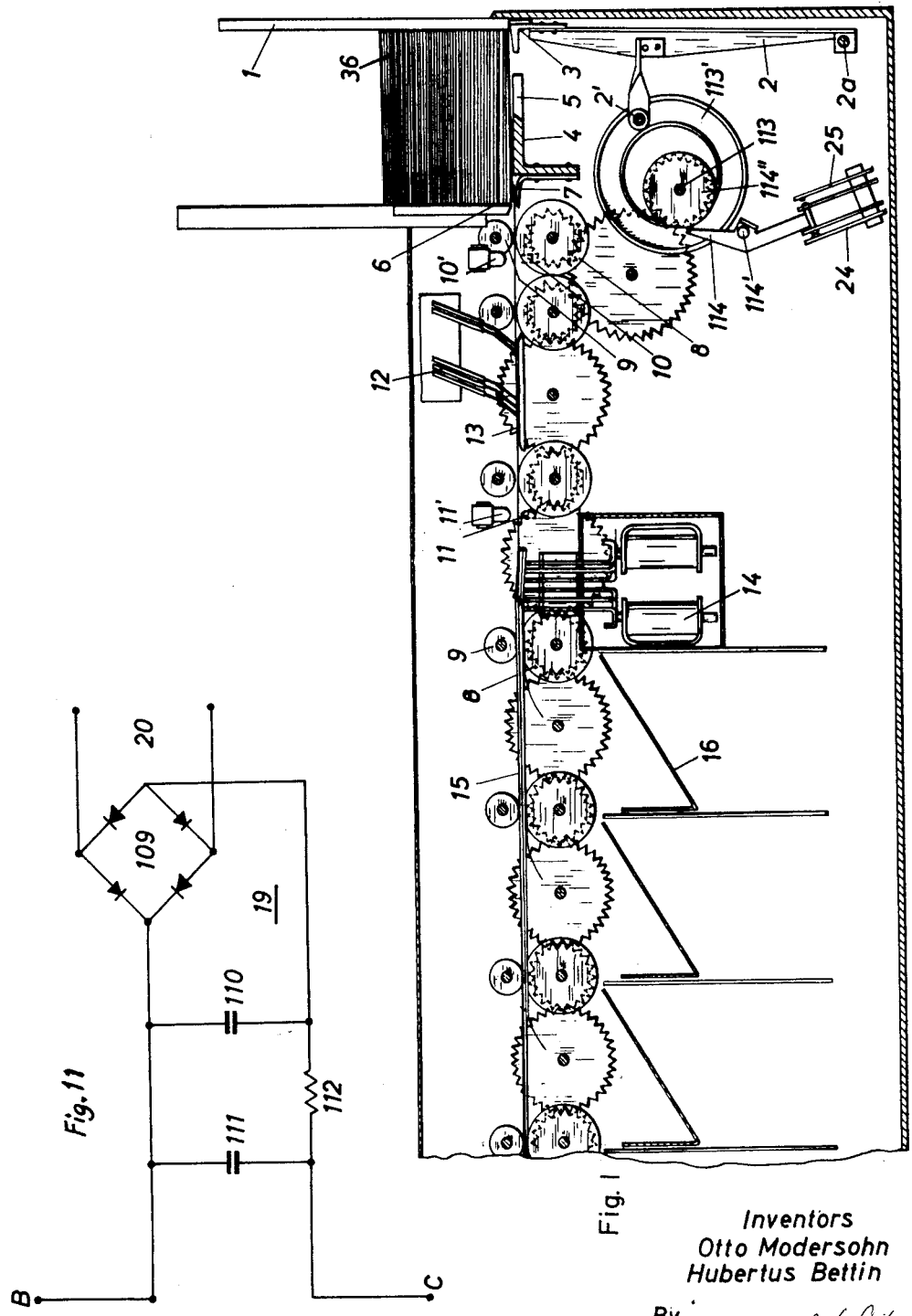
FIG. 1 is a diagrammatic, partly sectional elevation of a punched-card sorting machine to which the invention applies.

Referring now to FIG. 1, a punched-card sorting machine is equipped at one end thereof with a vertical well 1 which accommodates a stack of cards 36 and is partly closed at its bottom by a member 4 on which the stack of cards rests. A reciprocating feed blade 3 is carried by a rocker arm 2 pivotably supported by a shaft 2a. An eccentric groove cam 113′ is rotated by drive means, not shown, about its shaft 113 and is continuously engaged by a cam follower 2′ attached to the rocker lever 2. Consequently, with each rotation of the cam 113′ the feed blade 3 is moved forward into a corresponding cut-out 5 in the bottom member 4 and back to the position shown in FIG. 1. In the forward stroke of the feed blade 3 the lowermost card is pushed forward through a gap or throat 6 defined by a member 7 until the front edge of the card is engaged between a feed roller 8 and an idling counter roller 9. A plurality of pairs of such feed and counter rollers 8, 9 are arranged along the path of the cards and are all interconnected with each other and with the drive of the cam 113′ by a corresponding number of gears as shown. Consequently any card engaged between the first set of rollers 8, 9 is continuously passed on from one pair of rollers to the next one.

Between the second and third pair of rollers 8, 9 a contact plate 13 is stationarily mounted opposite to a set of sensing brushes 12. Thus each card travelling over the contact plate 13 is sensed by the brushes 12 which close a circuit between the individual brush 12 and the contact plate 13 whenever the particular brush meets a punched hole in the card.

Two photo-electric scanning devices are provided along the path of the card. For instance a photocell 10 is located opposite a light bulb 10′ for scanning the passing of the rear edge of a card, and a second photocell 11 is mounted opposite a light bulb 11′ for scanning the arrival of the forward edge of a moving card.

In the direction of travel of the cards, beyond the location of the photocell 11, an electro-mechanical distributing and sorting station is arranged. In order to distribute the cards into the proper compartments 16 a plurality of guide strips 15 of generally known type are arranged along the path of the card, i.e., along either side thereof without interfering with the engagement of the cards with the rollers 8 and 9. The individual guide strips 15 are superimposed over each other as shown, but have different lengths, the lowermost strip ending with a curved portion above the first compartment 16, the next strip ending in a similar fashion above the second compartment and so on. The front ends of the strips 15 serve as deflectors for the moving cards. The electro-magnets 14, when energized, deflect downwardly one or more of the strips 15, and, as is well known, depending upon the number of strips deflected simultaneously a channel or path is opened for an arriving card to be guided between the deflected and the non-deflected strips 15 into the proper compartment. The number of strips 15 deflected depends upon the location of a sensed hole in the particular card.

It can be seen from FIG. 1 that the shaft 113 carries also a cam 114″ which serves to operate, via a rocker lever 114 pivoting about a stationary shaft 114′, a pair of switch contacts 24, 25. Depending upon the position of the cam 114″ during each rotation thereof one of the contacts 24, 25, is in closed position and the other one is in open position.

Figure 3:
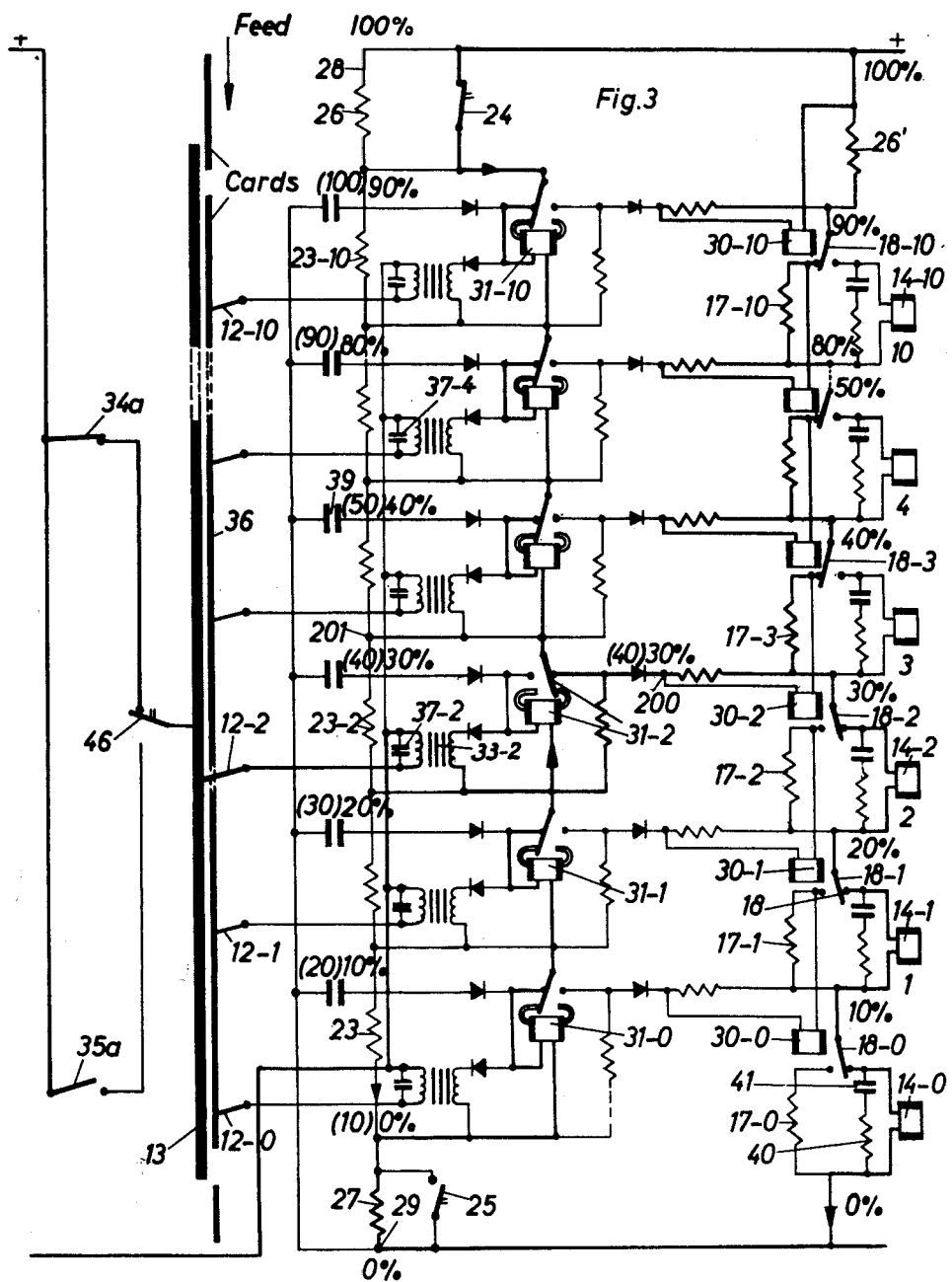
FIG. 3 is a detailed schematic circuit diagram illustrating an embodiment of the invention in which electro-mechanical control elements are used.

Although, as stated above, an embodiment of the invention incorporating electronic control elements is preferred, the following description will be based first on FIG. 3 in which an embodiment is illustrated incorporating electro-mechanical control devices.

FIG. 3 shows diagrammatically the contact plate 13 and a plurality of sensing brushes 12-0 to 12-10, the brushes being separated from the contact plate 13 by the cards 36, except for the brush 12-2 which makes contact with the plate 13 through a hole in the card 36. Corresponding to the number of sensing brushes, a series of electromagnets 14-0 to 14-10 is shown at the right hand margin of FIG. 3. Each of the electromagnets 14 is connected in parallel with a series-combination of a resistor 40 and a capacitor 41 for the reasons mentioned further above. Each of the electromagnets 14 is associated with a load resistor 17-0 to 17-10, respectively, one end terminal of each electromagnet 14 being permanently connected with the end terminal of the associated load resistor 17. A plurality of change-over switches 18-0 to 18-10 is arranged and connected respectively between the consecutive combinations of electromagnets and load resistors, the switch 18-10 being connected between the combination 14-10, 17-10 and an input resistor 26′ (the purpose of which will be explained further below) which in turn is connected at its other end to the positive terminal of a source of electric energy, not shown in FIG. 3.

As will be explained further below, the changeover switches 18-0 to 18-10 are normally in a first position in which they connect all the load resistors 17-0 to 17-10 in series with each other as a resistor chain between the terminals of the source of energy. However, whenever the change-over switches are moved by means explained further below into their second position, as illustrated for the switches 18-0 to 18-2, the corresponding load resistors 17-0 to 17-2 are disconnected and the respectively associated electromagnets 14-0 to 14-2 are connected in the chain as a replacement for the load resistors 17-0 to 17-2. Consequently, by the change of positions of the change-over switches 18-0 to 18-2 the associated electromagnets 14-0 to 14-2 are energized. In each combination of an electromagnet 14 with a load resistance 17, the parameters of these two combination elements are so chosen that the impedance of one of these elements is substantially equal to the impedance of the other one of these elements. Consequently, one important object of the invention is hereby attained since under these conditions evidently the load imposed on the source of electrical energy by the operation of the just described chain or series of resistance-electromagnet combinations remains substantially constant irrespective of the number of electromagnets energized simultaneously.

The change-over switches 18-0 to 18-10 have the character of a relay and are therefore actuated by means of associated solenoids 30-0 to 30-10, respectively. As can be seen the individual solenoids 30-0 to 30-9 are connected in parallel with the associated load resistors 17-1 to 17-10, while the solenoid 30-10 is similarly connected in parallel with the above mentioned input resistor 26′ which in this respect takes the place a load resistor. Consequently, all the solenoids 30-0 to 30-10 are normally energized so as to hold the associated change-over switches 18-0 to 18-10 in their abovementioned normal position establishing the series connection of all the load resistors 17-0 to 17-10. However, as soon as any one of the solenoids 30-0 to 30-10 is deenergized as will be explained further below the respective switch is released to move, under the action of a spring or the like, not shown, to its second position so as to energize the corresponding electromagnet. In addition, however, all the next following change-over switches are likewise released to the same effect. For instance, FIG. 3 illustrates the condition where solenoid 30-2 has been deenergized so as to permit the switch 18-2 to move to a second position and to energize electromagnet 14-2, and as a consequence of disconnection of the load resistor 17-2 also solenoid 30-1 is deenergized so as to cause energization of the electromagnet 14-1, and this in turn causes deenergization of the solenoid 30-0 so as to energize the electromagnet 14-0.

It will be understood that the last mentioned example of an operation of the arrangement applies to the case when the sensing brush 12-2 has sensed a hole in the card 36 as illustrated in FIG. 3. It can be seen that in this manner all those guide strips 15 (FIG. 1) will be deflected by the simultaneous energization of the electromagnet 14-0 to 14-2, which have to be deflected in order to guide the particular card 36 into that compartment into which the card has to be placed when a hole associated with the position of the sensing brush 12-2 is sensed.

Now the actuation, i.e., the movement of the change-over switches from their first to their second position by denergization of the respectively associated solenoid will be described. According to the invention, and as shown in FIG. 3, the chain or series of load resistors 17-0 to 17-10 and 26′ is matched by a chain or series of control resistors 23 to 23-10 and 26 which chain is connected in series with a control resistor 27 between the terminals of the source of energy, in parallel with the first mentioned chain of resistance-electromagnet combinations and the input resistor 26′. It is to be understood, that the effective resistance values of resistors 26 and 26′ are equal, and similarly the effective resistance value of each of the control resistors 23 to 23-10 matches the effective resistance values of the respectively corresponding load resistors 17-0 to 17-10, respectively. Consequently, the potential available at each of the junction points between the resistors of one of these chains are normally substantially equal to the potentials available at the junction points between the resistors of the other chain. Irrespective of what is the actual voltage available between the positive and negative terminals of the source of electric energy, it can be seen readily that normally 100% of this voltage is available at the ends of both chains connected to the positive input line. From there down through the two chains the voltage drop caused by the individual resistors will reduce the available potential at the junction points consecutively to 90%, 80%, ... 10% and finally 0%. In FIG. 3 these percentages of the available maximum potential are marked accordingly at every one of the respective junction points. Consequently, for example, the solenoid 30—2 is connected between a terminal of the change-over switch 18–3 carrying 40% of potential, and a junction point connected to the end terminal of the load resistor 17–3 carrying approximately 30% of the potential. Consequently the solenoid 30–2 is energized by the resulting potential difference.

According to the invention the deenergization of a solenoid is effected by raising the potential at the second terminal thereof to the level of the potential existing at the first terminal of this solenoid. To return to the above described example of solenoid 30–2, the potential at the terminal point 200 is to be raised from 30% to substantially 40% of the total potential. This necessarily results in a deenergization of the solenoid 30–2.

The raising of potential at the terminal point 200 is effected in the following manner. As can be seen from FIG. 3 cross-connections are provided between corresponding junction points of the two above mentioned chains. For instance, a connection exists between the point 200 and the junction point 201. However this connection is interrupted by an interposed relay switch 31–2 which responds to sensing impulses from the brush 12–2 as will be explained below. When the relay 31–2 is energized so as to move its switch member into the position shown in FIG. 3 the circuit between the points 200 and 201 is prepared. As mentioned before, the junction point 201 would normally have a potential mounting to 30% of the total voltage furnished by the source of electric energy. If now, after relay 31–2 has been energized, the switch 24 is moved into the closed position shown by FIG. 3 while simultaneously the switch 25 is moved into open position as also shown in FIG. 3, then the potentials available at all of the junction points of the chain of control resistors 23 to 23–10 are shifted, i.e., raised an amount corresponding to the voltage drop across the resistor 26 which is now shunted by the closing of the switch 24 while the series-connected resistor 27 causing the same amount of voltage drop is now rendered effective. The operation of the switches 24, 25 has been described above in reference to FIG. 1. Since now the junction point 201 asumes the raised potential of 40% of the total potential, also the potential at the terminal point 200 is raised to 40% of the total potential.

The energization of the relays 31–0 to 31–10 in response to the sensing of holes in the cards by the sensing brushes 12–0 to 12–10, respectively, is effected in the following manner. Each of the sensing brushes is connected with one terminal of the primary winding of a transformer, e.g., the brush 12–2 is connected with the primary winding of the transformer 33–2, the other terminal of all of the primary windings being connected to a common line carrying negative potential. The contact plate 13 carries positive potential provided that switch 34a is closed and the change-over switch 46 is in the position shown, or that switch 35a is closed and the switch 46 is in its opposite position. Consequently the sensing of a hole, e.g., by the brush 12–2 results in an input pulse into the primary winding of transformer 33–2, a condenser 37–2 being connected in parallel with this primary winding as explained further above. The coil of the relay 31–2 is connected in a circuit which includes the secondary winding of the transformer 33–2. The arrangement in the actuator circuits related to the other sensing brushes is exactly analogous.

It will be understood that in each of the just described actuator circuits the primary winding of the transformer 33 together with the associated capacitor 37 constitutes a resonance circuit which is impulsed by an impulse of predetermined form, the form of the impulse being determinable by suitable circuit arrangements which may contain the switch devices 34a and 35a. In this manner also all those interfering or undesired impulses which have not the desired and predetermined form, are absorbed by the condenser and the primary winding. From this it follows that the form of the impulses must have a form according to which the rise at the front corresponds to the resonance frequency of the resonance circuit constituted, as mentioned above by the primary winding of the transformer and of the parallel connected capacitor.

Figure 2:
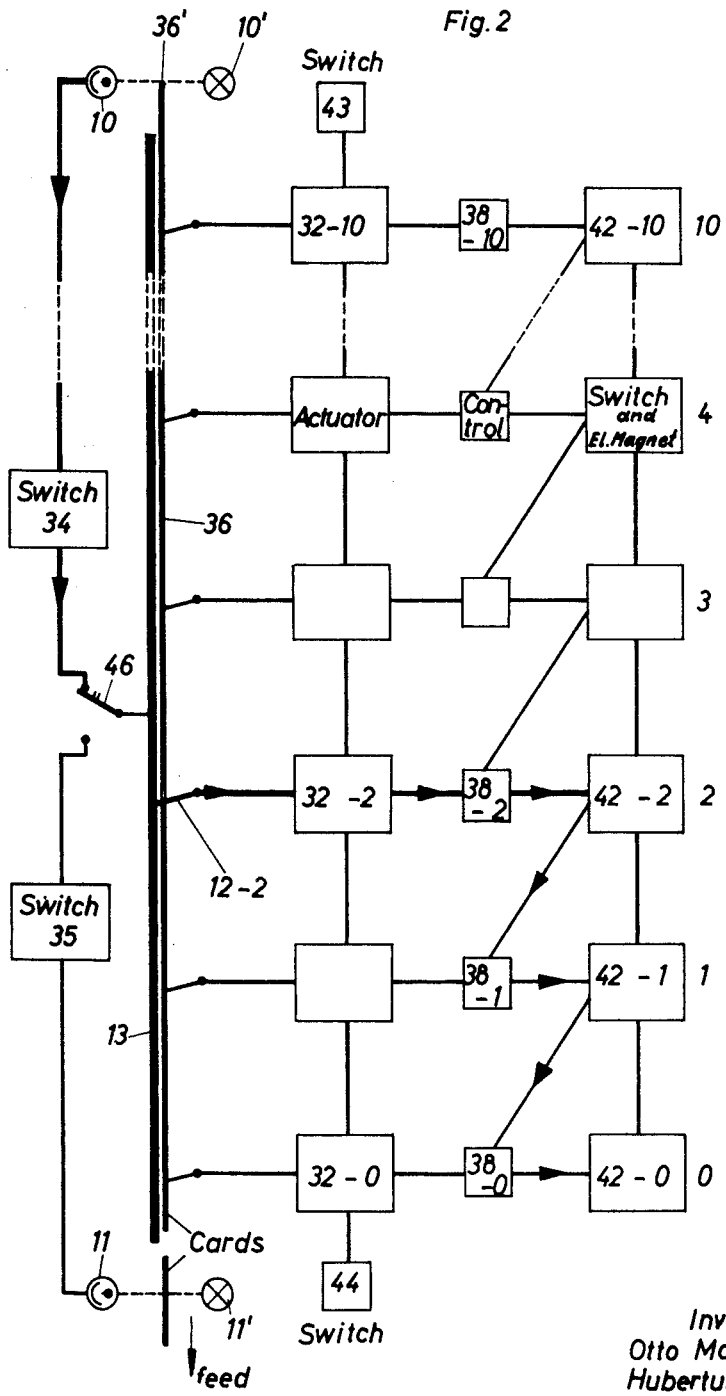
FIG. 2 is a schematic block diagram illustrating a control arrangement according to the invention, and showing particularly the flow of control current in a particular phase of its operation.
Figure 4:
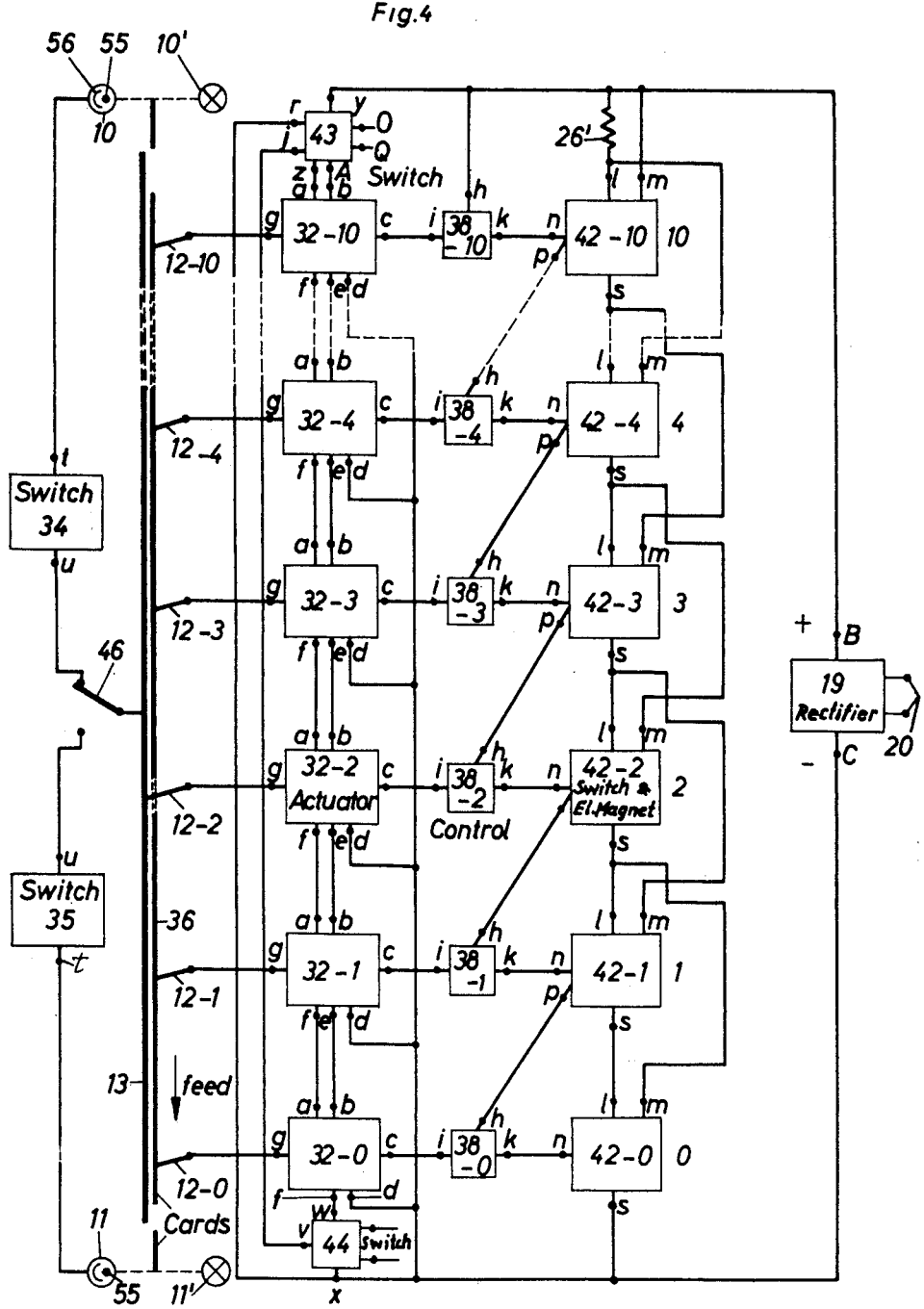
FIG. 4 is a schematic block diagram illustrating a similar embodiment of the invention in which however electronic control means are employed.

Although this is not shown in FIG. 3, it should be understood that the switches 34a and 35a are controlled exactly as described in reference to FIGS. 2 and 4, by the photo-electric means 10, 10' and 11, 11', respectively, scanning the front and rear edges, respectively, of the moving cards. Switch 46 may be operated manually depending upon whether positive potential should be applied to the contact plate 13 depending upon the scanning of the front edge or of the rear edge of the cards, which in turn depends upon whether, in the case of two-deck cards, one or the other deck is to be used in the sorting operation.

After one sensing or sorting operation the required electromagnets 14 have been energized and the corresponding deflector devices, i.e., the corresponding guide strips 15 have been moved to a position for guiding the respective card into the proper compartment, the switches 24 and 25 (FIG. 1) are moved by the cam 114" to a position opposite to that which is shown in FIG. 3, and hereby the above mentioned shift of potential at the various junction points of the control resistor chain is reversed whereby all the previously actuated control means are also returned to their normal position. At this moment the cancelling capacitor 39 associated with the particular actuator relay 31 which had been energized, will temporarily assume a potential higher than that present in the particular relay circuit 31.

Now FIG. 2 will be described which is intended to show comprehensively the characteristic of the operation described above, although FIG. 2 refers to an embodiment of the invention in which the above described electro-mechanical control means are replaced by electronic circuits. For the sake of clarity certain details have been omitted in FIG. 2. However, it can be seen that the card 36 is in position travelling over the surface of the contact plate 13, a hole in the card 36 being sensed by the sensing brush 12–2. The switch 46 being in the position shown in FIG. 2, the electronic switch arrangement 34 is rendered operative. Thereby the photo-electric scanning arrangement 10, 10' is likewise rendered operative so as to control the switch arrangement 34. As can be seen, the photo-electric arrangement 10, 10' is just scanning the rear edge 36' of the card 36. If the switch 46 were in its other position then the switch arrangement 35 and the front edge scanning arrangement 11, 11' would be operative.

In FIG. 2 the blocks 42–0 to 42–10 represent electronic switch and electromagnet combinations corresponding essentially to the resistance-electromagnet combinations 14–0, 17–0 to 14–10, 17–10, respectively, of FIG. 3. The control circuits 38–0 to 38–10 correspond substantially to the solenoids 30–0 to 30–10, respectively, of FIG. 3. The actuator circuits 32–0 to 32–10 correspond essentially to the actuator arrangements comprising the transformers 33 and the relays 31 of FIG. 3. Finally, the switch arrangemements 43 and 44 correspond to the combinations of switch 24 and resistor 26, and of switch 25 and resistor 27, respectively, of FIG. 3.

As is indicated by heavy lines in FIG. 2 the sensing impulse derived from the sensing brush 12–2 is applied to the actuator arrangement 32–2 and transmited from there to the control arrangement 38–2, which again serves to actuate the associated switch and electromagnet arrangement 42–2 so that the electromagnet 14–2 incorporated therein is energized. However, this results automatically in an actuation of the control circuit 38–1 which actuates in the same manner the switch and electromagnet arrangement 42–1 so as to energize the corresponding electromagnet 14–1, and as a consequence the control arrangement 33–0 is actuated so as to actuate, in turn, the switch and electromagnet arrangement 42–0 for thereby energizing the corresponding electromagnet 14–0.

FIG. 4 illustrates in more detail the overall circuit arrangement of the above mentioned embodiment having electronic control arrangements. The reference numerals used in FIG. 2 apply similarly to the elements of the arrangement according to FIG. 4 so that a repetition of the above explanation is not required. In addition to FIG. 2, the circuit of FIG. 4 shows also the arrangement of an input resistor 26' in the same manner as shown in FIG. 3 and described accordingly. Further FIG. 4 illustrates the input of electric energy from a supply line 20 by means of an electronic rectifier arrangement 19.

Referring now to FIG. 11, the rectifier arrangement 19 comprises a full-wave rectifier 109 which is connected to the power supply line 20, a charge condenser 110, a filter resistance 112 and a filter condenser 111. The hereby rectified line voltage is supplied through the terminals B and C to the network of the machine.

Figure 6:
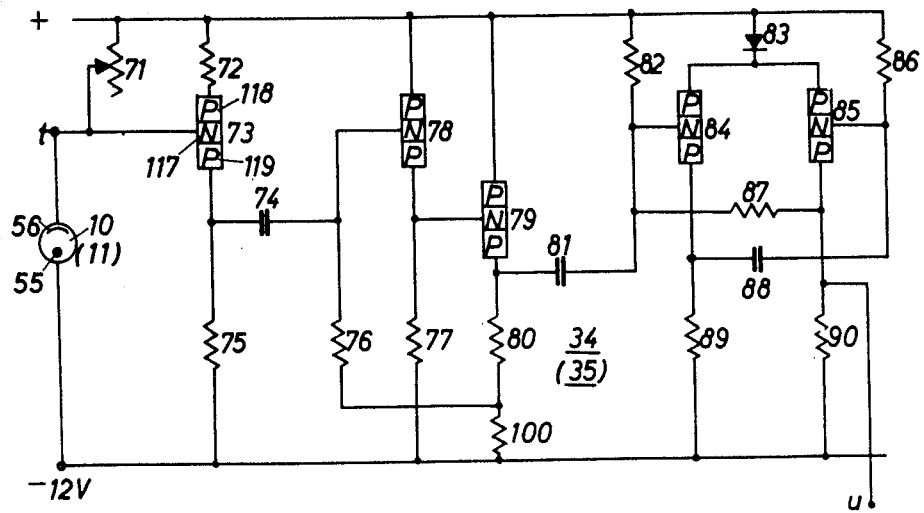
FIG. 6 is a schematic circuit diagram illustrating the switch means 34 and 35 of FIG. 4.

FIG. 6 illustrates both the switch arrangement 34 and the switch arrangement 35 because these two arrangements are practically identical. The circuit of FIG. 6 is supplied from a source, not shown, with 12 volts D.C. voltage. To the negative input line are connected the cathodes 55 of the photo-diodes 10 and 11, respectively, illustrated in FIG. 4. The anodes 56 of these diodes are connected to the terminal $t$ so as to influence the base 117 of a transistor 73 the operating point thereof relative to the emitter 118 (which is connected to the positive line across a resistor 72) may be adjusted by means of a voltage tapped from a variable resistor 71. An impulse furnished by the photocell 10 or 11 can be tapped from a junction point between the collector 119 and the resistor 75 and is supplied via the condenser 74 to an amplifier circuit which consists of the transistors 78 and 79 and the resistors 76, 77, 80 and 100 and which is connected for feed-back by the resistors 80 and 76. The amplified output of the amplifier is then supplied via the condenser 81 to a monostable multi-vibrator consisting of the transistors 84, 85, the resistors 90, 82, 86, 87 and 89, the diode 83 and the condenser 88. During the relaxation period determined by the size of the condenser 88 the amplified impulse is transmitted from the output terminal $u$ of the switch arrangement 34, 35, respectively, to the switch 46 and from there to the contact plate 13 as seen in FIG. 4.

Figure 5:
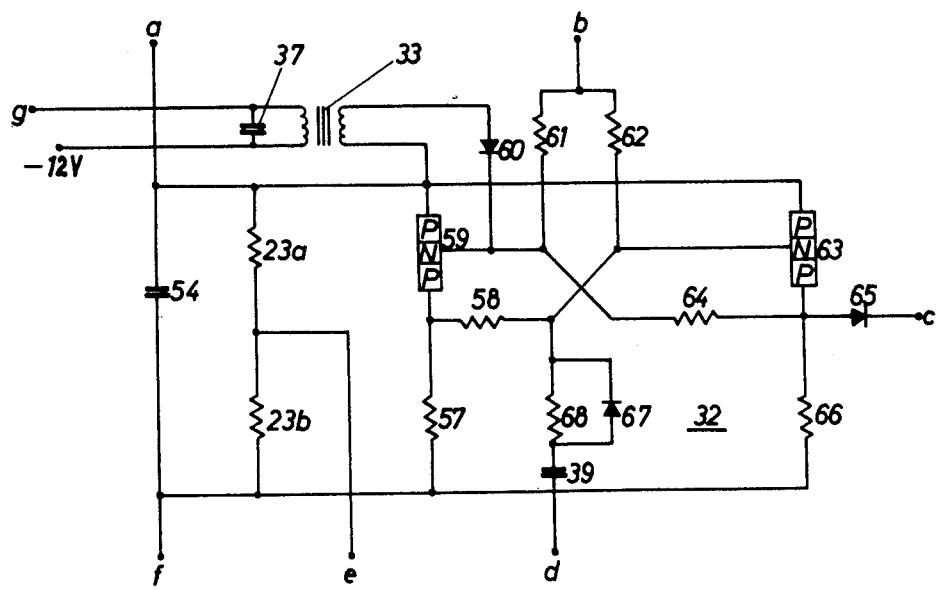
FIG. 5 is a circuit diagram illustrating the details of any one of the actuator means 32 in FIG. 4.

The impulse resulting from the sensing of the sensing brush, e.g., 12–2 in FIG. 4 upon meeting a hole in the card 36 is supplied to the input terminal $g$ of the associated actuator circuit, e.g., 32–2 in FIG. 4. From this terminal $g$ as shown in FIG. 5 the sensing pulse is applied to the transformer 33 and to the parallel connected condenser 37. The terminals $a$ and $f$ (FIG. 4 and FIG. 5) correspond to the above described junction points between the control resistors 23 of FIG. 3. However according to FIG. 5 the individual control resistor 23 is replaced by two resistors 23$a$ and 23$b$, connected in series. Also the condenser 54 connected in parallel with the series-connected resistors 23$a$, 23$b$ constitutes an element of the control resistor chain. The circuit according to FIG. 5 further comprises a bistable multi-vibrator constituted by the transistors 59 and 63, and the resistors 61, 62, 58, 64, 57 and 66. This bistable circuit is changed by the output of the transformer 33 via diode 60 to operative condition from which it is returned to normal position by the application of negative potential from terminal $d$ via the condenser 39, the resistor 68 and the parallel connected diode 67. As can be seen from FIG. 4, all the terminals $d$ are connected to the negative terminal C of the rectifier 19.

Figure 7:
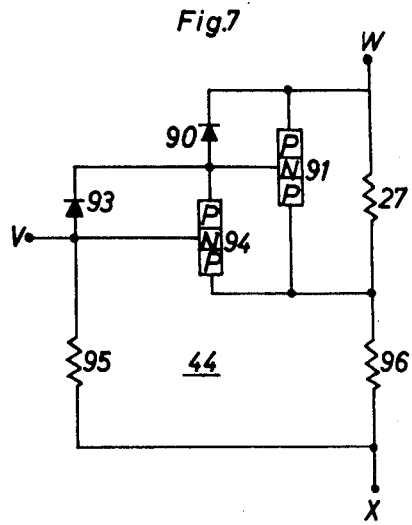
FIG. 7 is a circuit diagram illustrating the switch means 44 of FIG. 4.
Figure 9:
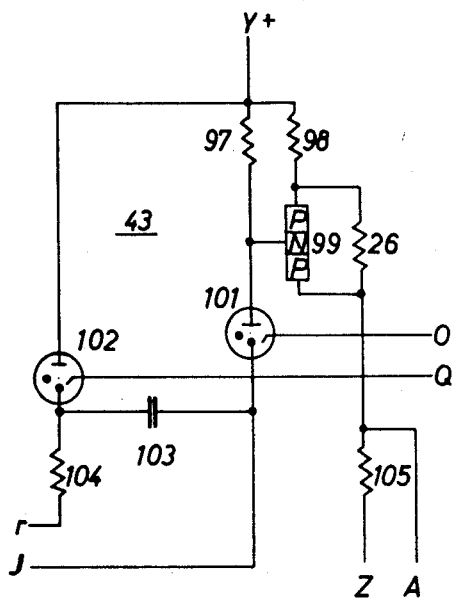
FIG. 9 is a circuit diagram illustrating the switch means 43 of FIG. 4.

As can be seen from FIGS. 4 and 9, the chain or series of resistors 23$a$, 23$b$ of the various actuator circuits 32–0 to 32–10 is terminated in the switch arrangement 43 according to FIG. 9 by the resistors 98, 105 and 26 which are connected in series with each other and at the terminal $y$ with the positive terminal B of the rectifier 19. At the opposite end the just mentioned chain is terminated according to FIG. 4 and FIG. 7 by the resistors 96 and 27 which, in turn, are connected in series with each other and with negative potential available at the terminal point $x$ and thereby to the negative terminal C of the rectifier 19. The switch circuit 43 according to FIG. 9 further comprises relay tubes 101 and 102, a switching transistor 99 and resistors 97 and 104. The terminal $r$ is connected to negative potential as available at the terminal point $x$, while the terminal $j$ is directly connected to the terminal $v$ mentioned further below. The tubes 101 and 102 are respectively connected with the above mentioned cam-operated contacts 24, 25, respectively, whereby these tubes are alternatively ignited. When voltage is applied at O the relay tube 101 is ignited whereby the transistor 99 is rendered conductive so as to shunt the resistor 26. The circuit of FIG. 7 illustrating the arrangement 44 in FIG. 4 is connected as indicated by the reference characters $v$, $w$ and $x$. In view of the described and shown connections, upon application of voltage at O of FIG. 9, the transistors 91, 94, the diodes 90, 93 and the resistor 95 cause the transistors 94 and 91 to become non-conductive so that as a result the resistor 27 is fully effective. When, on the other hand, voltage is applied to Q, then the relay tube 102 is ignited and blocks thereby the relay tube 101 via the condenser 103. The result is that the above described function is reversed and that now the resistor 26 (FIG. 9) becomes fully effective in the circuit while the resistor 27 (FIG. 7) is shunted so that in this manner the control resistor chain composed of the above described element combinations 23$a$, 23$b$ and 54 undergoes a shift of potential back to normal as described above.

Figure 8:
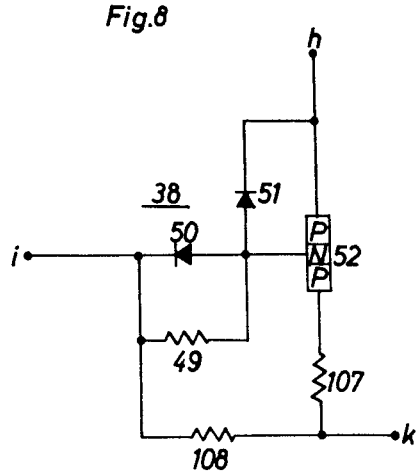
FIG. 8 is a circuit diagram illustrating any one of the control means 38 in FIG. 4.

According to FIG. 8 the control circuit 38 comprises a transistor 52, diodes 50, 51 and resistors 49, 107 and 108. A sensing impulse applied to the input terminal $i$ from the associated actuator circuit according to FIG. 5 has the effect that the transistor 52 which was in conductive condition, is now rendered non-conductive with the result that the previously existing potential at the point $k$ now drops.

Figure 10:
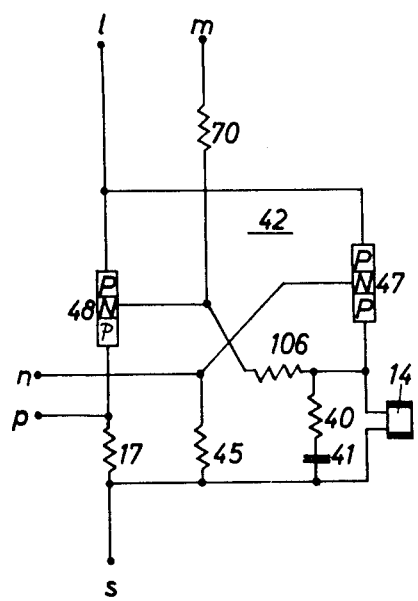
FIG. 10 is a circuit diagram illustrating any one of the switch and electromagnet units 42 of FIG. 4.

Finally, FIG. 10 illustrates one of the switch and electromagnet arrangements 42 (FIG. 2 and FIG. 4). This arrangement comprises one of the previously described electromagnets 14 and the likewise previously described load resistor 17, and in addition transistors 47, 48, resistors 45, 70, 106 which arrangement defines a monostable multi-vibrator circuit, supplemented by the above described series combination of a resistor 40 and a capacitor 41 connected in parallel with the electromagnet 14.

When, as described above the potential drops at the terminal point $k$ and correspondingly potential also drops at the terminal $n$, the transistor 47 is rendered conductive. On the other hand, the transistor 48 is rendered non-conductive. This results in energization of the electromagnet 14 while the load resistor 17 is disconnected. Due to the non-conductivity of the transistor 48 the potential at the terminal point $p$ drops with the result that the input potential at the terminal $h$ of the next following control circuit 38 according to FIG. 8 also drops and renders the latter non-conductive. This however has the effect that via terminal $k$ of this particular control circuit and terminal $n$ of the next switch and electromagnet arrangement 42 the latter is actuated which operation then repeats automatically until the last one of the various switch and electromagnet arrangements 42 of the chain thereof is actuated. It can be seen that by the application of voltage to the point Q of the circuit 43 according to FIG. 9 the whole arrangement is returned to normal position of rest.

It should be noted that the potential shift back to normal at the resistors 23$a$, 23$b$ (FIG. 5) has the effect that the potential at the condenser 39 is temporarily raised whereby the transistor 63 is rendered non-conductive and the bistable multi-vibrator circuit including the transistors 63 and 59 also returns to normal condition.

It will be understood that each of the elements described above, or two or more together, may also find a useful application in other types of a card sorting machine differing from the types described above.

While the invention has been illustrated and described as embodied in a card sorting machine with electrical controls, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A distribution network, comprising, in combination, a source of electric energy; a series of energizable electromagnet means, each having a predetermined impedance; a series of load resistance means respectively associated with said energizable electromagnet means to form a series of resistance-electromagnet combinations, the impedance of each of said load resistance means being substantially equal to the impedance of the respectively associated energizable electromagnet means; circuit means including a plurality of change-over switch means respectively associated with said resistance-electromagnet combinations and each being movable between a normal first position and a second position, said plurality of change-over switch means being arranged between said resistance-electromagnet combinations, respectively, for connecting, when in said first position, all of said load resistance means with each other as a series-chain between the terminals of said source of electric energy, a movement of any one of said change-over switch means to its second position resulting in connecting immediately the respectively adjacent electromagnet means as an element of said chain in replacement of the respectively associated load resistance means thereby causing immediately energization of the particular electromagnet means; a plurality of actuating means respectively associated with said change-over switch means for actuating the latter; and a plurality of energizing means respectively associated with said actuating means for selectively energizing the respectively associated one of said actuating means so as to actuate the corresponding one of said change-over switch means, whereby the load on said source of electric energy remains substantially constant irrespective of the number of energizable electromagnet means that are energized simultaneously.

2. A distribution network, comprising, in combination, a source of electric energy; a series of energizable electromagnet means having each an input and an end terminal; a series of load resistance means having each an input and an end terminal and each being respectively associated with a different one of said energizable electromagnet means, and said end terminals of each of said energizable electromagnet means being connected with said end terminal of the respectively associated resistance means so as to form a corresponding resistance-electromagnet combination, the impedance of each of said energizable electromagnet means being substantially equal to the impedance of the associated resistance means; a plurality of change-over switch means connected respectively between one terminal of said source and the input terminals of the first one of said resistance-electromagnet combinations, and between the mutually connected end terminals of each of said combinations and the input terminals of the respectively following next combination, said plurality of change-over switch means connecting in their normal first position all of said load resistance means as a series-connected resistor chain, a movement of any one of said change-over switch means to its second position resulting in rendering the respectively adjacent energizable electromagnet means an element of said resistor chain in replacement of the respectively associated one of said resistor means thereby causing energization of the particular energizable electromagnet means, the end terminals of the last one of said resistance-electromagnet combinations being connected to the other terminal of said source; a plurality of actuating means respectively associated with said change-over switch means for actuating the latter; and a plurality of energizing means respectively associated with said actuating means for selectively energizing the respectively associated one of said actuating means so as to actuate the corresponding one of said change-over switch means; whereby the load on said source of energy remains substantially constant irrespective of the number of energizable electromagnet means that are energized simultaneously.

3. A network as claimed in claim 2, wherein said actuating means each include a relay-type circuit means responding to the action of the corresponding energizing means by enabling the corresponding change-over switch means to be moved between said positions.

4. A network as claimed in claim 3, wherein said actuating means include a chain of control resistance means connected in parallel with said chain of series-connected load resistance means, the consecutive control resistance means of said chain thereof corresponding to the consecutive load resistance means, respectively, of said chain thereof and having each substantially the same impedance as the corresponding load resistance means so that normally the potentials available at the junction points between any consecutive two of said control resistance means is substantially the same as the potentials available at the corresponding junction points between the corresponding consecutive two corresponding load resistance means, a plurality of cross-connections being provided between said corresponding junction points of said two chains, each of said cross-connections being arranged to be normally interrupted by a corresponding one of said relay-type circuit means, but to be rendered conductive when the respective relay-type circuit means responds to the action of the energizing means respectively associated with the respective actuating means, potential shifting means being provided for shifting said potentials available at all of said junction points between said control resistance means a predetermined amount for establishing a potential difference between those corresponding junction points of said two chains which are interconnected by a cross-connection rendered conductive by one of said relay-type circuits means, said potential difference resulting in actuation of the corresponding change-over switch means.

5. A network as claimed in claim 4, wherein each of said relay-circuit means is galvanically separated from the corresponding energizing means, but operatively coupled therewith.

6. A network as claimed in claim 5, wherein each of said relay-circuit means is coupled with the corresponding energizing means by transformer means.

7. A network as claimed in claim 6, wherein between each of said transformer means and the corresponding energizing means a selective blocking means is inserted for preventing undesired voltage pulses from energizing said transformer means and the corresponding relay-type circuit means.

8. A network as claimed in claim 7, wherein said selective blocking means comprises an inductance constituted by the primary winding of the corresponding transformer and a filter capacitor connected in parallel therewith, said capacitor and said inductance constituting a resonance circuit of predetermined resonance frequency.

9. A network as claimed in claim 3, wherein for each of said change-over switch means a relay-type control means is provided and operatively connected therewith for actuating the latter in response to a shift of potential at that junction point between said control resistance means which corresponds to the junction point between the load resistance means preceding in said chain of load resistance means the load resistance means associated with the change-over switch means to be actuated, and the consecutively following load resistance means.

10. A network as claimed in claim 9, wherein said relay-type control means comprises a transistor and a diode connected in antiparallel relation to the emitter-base circuit of said transistor.

11. A network as claimed in claim 3, wherein each of said relay-type circuit means in said cross-connections is connected at one side to zero potential of said source of energy, a canceling capacitor being connected in the respective connection between the relay-type circuit means and zero potential.

12. A network as claimed in claim 2, wherein for each of said energizable electromagnet means a corresponding compensating circuit means is provided and connected therewith for compensating the current/time characteristic of said electromagnet means, said compensating circuit means having a current/time characteristic contrary to that of said electromagnet means.

13. A network as claimed in claim 12, wherein said compensating circuit means comprises a series-combination of a resistance and a capacitance connected in parallel with said energizable electromagnet means.

14. A network as claimed in claim 10, wherein for each of said energizable electromagnet means a corresponding compensating circuit means is provided and connected therewith for compensating the current/time characteristic of said electromagnet means, said compensating circuit means having a current/time characteristic contrary to that of said electromagnet means.

References Cited in the file of this patent
UNITED STATES PATENTS

| | | |
|---|---|---|
| 2,841,748 | Reynolds | July 1, 1958 |
| 2,862,618 | Gallagher | Dec. 2, 1958 |
| 2,923,863 | Chesson et al. | Feb. 2, 1960 |
| 3,078,393 | Winston | Feb. 19, 1963 |